United States Patent [19]

Kitamura

[11] Patent Number: 5,145,048
[45] Date of Patent: Sep. 8, 1992

[54] PALLET CHANGER

[75] Inventor: Koichiro Kitamura, Takaoka, Japan

[73] Assignee: Kitamura Machinery Co., Ltd., Japan

[21] Appl. No.: 442,336

[22] PCT Filed: Jun. 13, 1988

[86] PCT No.: PCT/JP88/00564
§ 371 Date: Oct. 27, 1989
§ 102(e) Date: Oct. 27, 1989

[87] PCT Pub. No.: WO88/10169
PCT Pub. Date: Dec. 29, 1988

[30] Foreign Application Priority Data

Jun. 19, 1987 [JP] Japan .................. 62-151099

[51] Int. Cl.$^5$ .......................... B65G 37/00
[52] U.S. Cl. ............... 198/346.1; 198/465.1;
414/225; 29/33 P; 29/563
[58] Field of Search ............ 198/346.1, 345.3, 465.1;
29/33 P, 563; 414/736, 749, 222, 225

[56] References Cited

U.S. PATENT DOCUMENTS

| 4,423,806 | 1/1984 | Ogasawara | 198/465.1 X |
| 4,970,765 | 11/1990 | Sakawa et al. | 198/346.1 X |
| 4,985,971 | 1/1991 | Kitamura | 29/33 P |
| 4,996,754 | 3/1991 | Kitamura | 29/33 P |
| 5,062,190 | 11/1991 | Kitamura | 29/33 P |

FOREIGN PATENT DOCUMENTS 56145030 11/1981 Japan.
57138555 8/1982 Japan.
6225135 2/1987 Japan.

Primary Examiner—Robert J. Spar
Assistant Examiner—Donald W. Underwood
Attorney, Agent, or Firm—Wegner, Cantor, Mueller & Player

[57] ABSTRACT

A pallet exchanger includes a machine tool table movable along a first axis and a second axis, a mounting arrangement for mounting a plurality of pallets each of which has a workpiece, a support for supporting the mounting arrangement, and a motive device for moving the mounting arrangement relative to the machine tool table along a third axis perpendicular to the first and second axes. The mounting arrangement includes a guide arranged along the first axis, first and second mounting parts, and an intermediate part between the first and second mounting parts. The motive device includes a drive device mounted on the support and an operating device driven by the drive device which moves the mounting arrangement on the support relative to the machine tool table.

8 Claims, 20 Drawing Sheets

PALLET CHANGER

TECHNICAL FIELD

This invention relates to a pallet changer to exchange pallets attached to, for example, a table of a machine tool.

BACKGROUND ART

A pallet changer is installed in front of a machine tool such as a vertical machining center. A plurality of pallets are located on a pallet stand of the pallet changer and hydraulic cylinders are fixed to the pallet stand. One hydraulic cylinder is provided for each pallet.

For example, when transferring the first pallet to the table, the table is moved to the position opposite to the first pallet. And, the first rod of the first hydraulic cylinder is expanded so that the first pallet engaging the first rod is transferred to the table. After the first rod is contracted, a work on the first table is machined. Next, the first rod is expanded to engage the first pallet. The first rod is then contracted so that the first pallet is returned to the pallet stand.

To transfer the second pallet, the table is moved to the position opposite to the second pallet. And, the second rod of the second hydraulic cylinder is expanded so that the second pallet engaging the second rod is transferred to the table. After the second rod is contracted, a work on the second table is machined. Next the second rod is expanded to engage the second pallet. The second rod is then contracted so that the second pallet is returned to the pallet stand.

With a pallet changer of this type, large hydraulic cylinders are used. Moreover, the number of hydraulic cylinders needed is equal to the number of pallets, consequently the pallet changer is heavy and large in size and expensive to make. Moreover, when the hydraulic cylinder starts or stops, the pallet and the work are shocked at its stroke end. The pallets can not be transferred in smooth manner.

DISCLOSURE OF INVENTION

The object of this invention is to provide a pallet changer in which a plurality of hydraulic cylinders are not needed. The pallet changer according to this invention is small in size and can exchange pallets smoothly.

A PALLET CHANGER

The pallet changer according to this invention is seen in FIGS. 3 and 5 which are explained as follows:

A place board 60 is a board on which a plurality of pallets 30, 50 are placed side by side. The place board 60 has guide means 81, 82.

A table 26 is located to a position corresponding to the place board 60. The place board 60 is supported by a support stand 61.

A transfer means 62 is to tranfer the place board 60.

A drive means 65 is provided to the support stand 61.

Operating means 66, 67 transfer the place board 60 from the support stand 61 to the table 26 and transfer the place board 60 from the table 26 to the support stand 61. Each first end of the operating means 66, 67 is related to the guide means 81, 82 of the place board 60. The operate means 66, 67 rotate clockwise or counter-clockwise around it's second end by predetermined degrees by means of the drive means.

In this invention, the operating means rotate clockwise or counter-clockwise by predetermined degrees by means of the drive means instead. of a plurality of hydraulic cylinders so that the place board 60 is transferred between the support stand 61 and the table 26. Thus, the pallets can be smoothly transferred without shock. In the pallet changer according to this invention, heavy hydraulic cylinders equal in number to the pallets is not needed. Therefore, the pallet changer is small in size and is inexpensive to produce.

BEST MODE FOR CARRYING OUT THE INVENTION

Figure 1:
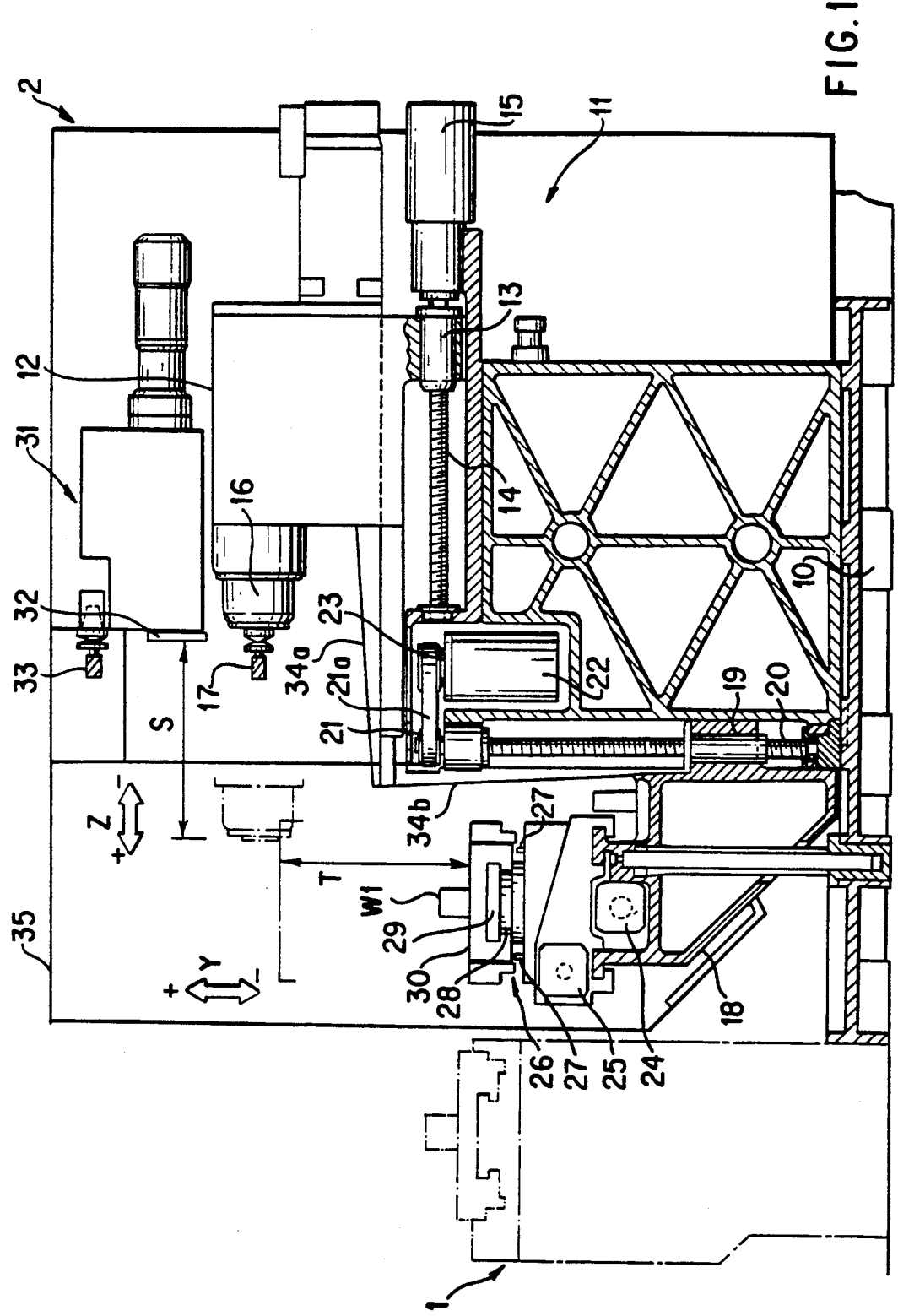
FIG. 1 is a sectional view showing a machine tool equipped with a pallet changer according to this invention.

A pallet changer 1 according to this invention and a machine tool 2 are shown in FIG. 1.

A MACHINE TOOL

The construction of the machine tool 2 in FIG. 1 is as follows:

A column 11 is provided to a base 10. A head 12 is mounted on the column 11. A nut 13 of the head 12 engages a feed screw 14. The feed screw 14 can rotate by means of a servomotor 15. The servomotor 15 is driven so that the head 12 is moved with a stroke S along the Z-axis as tool 17 is attached to a spindle of the head 12.

A knee 18 is provided to a front portion of the column 11. A nut 19 of the knee 18 engages a feed screw 20. The feed screw 20 is rotated by means of a servomotor 22. A belt 21a is provided between a pulley 23 of the servomotor 22 and a pulley 21 of the feed screw 20. The servomotor 22 is drived so that the knee 18 is moved with a stroke T along the Y-axis. Servomotors 24, 25 and a rotary type table 26 are provided to the knee 18. The table 26 has two clamp pins 27 and clamp cylinders 28. A clamp plate 29 is attached to the rod of the clamp cylinder 28. Pallets 30, 50 which are explained latter can be settled to the clamp plate 29.

An automatic tool changer 31 is provided above the head 12. A rotation arm 32 is rotated so that the tool 17 is exchanged for a tool 33 stored at the automatic tool changer 31.

The machine tool has a slide covers 34a, 34b and a splash guard 35.

Figure 2:
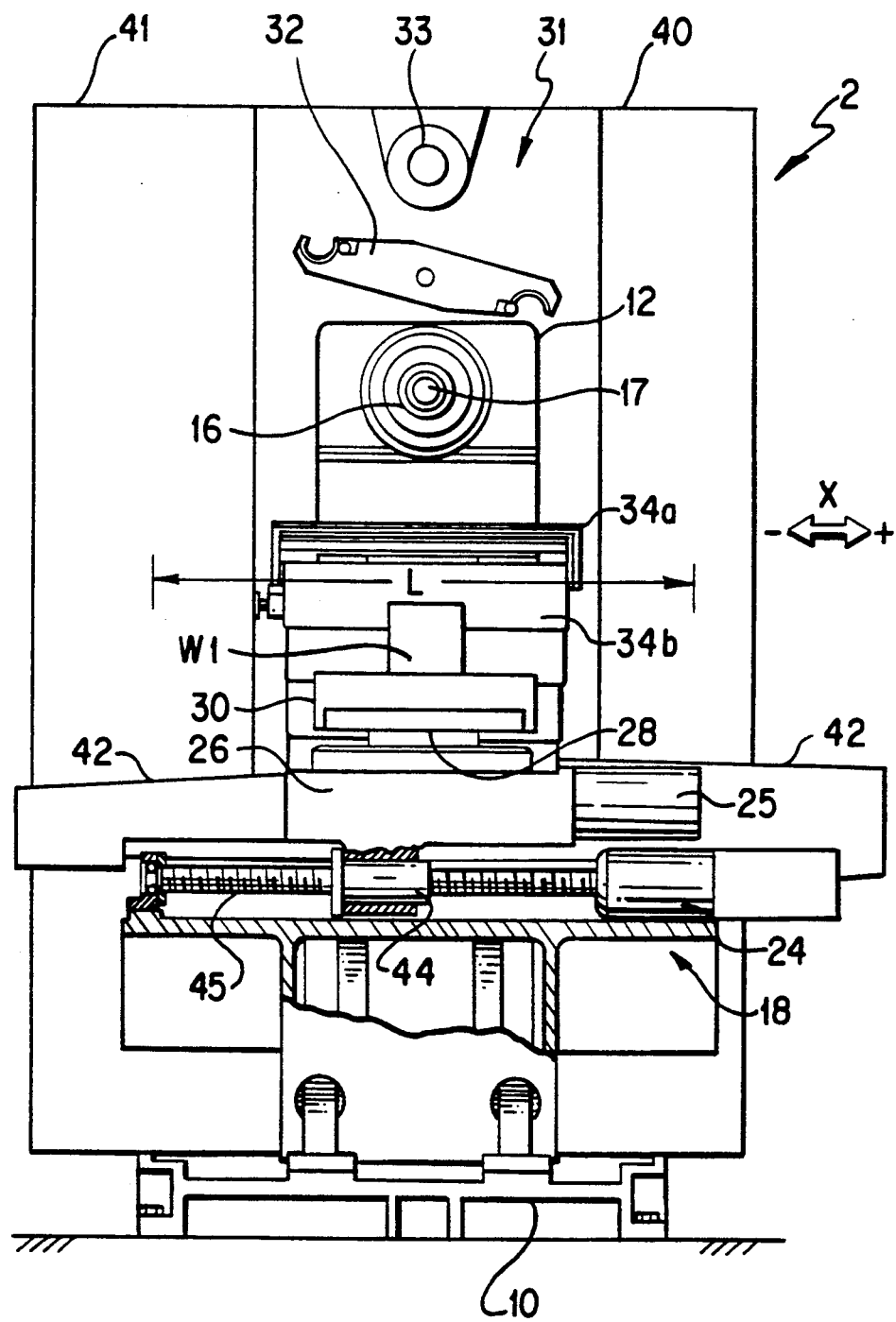
FIG. 2 is a front view, partly in cross section, of the machine tool.

FIG. 2 is explained below:

The machine tool has also a control board 40 and a CNC device 41. A nut 44 of the table 26 engages a feed screw 45. The feed screw 45 is rotated by means of the servomotor 24. The servomotor 24 is rotated so that the table 26 is moved with a stroke L along the X-axis.

PALLET

Figure 3:
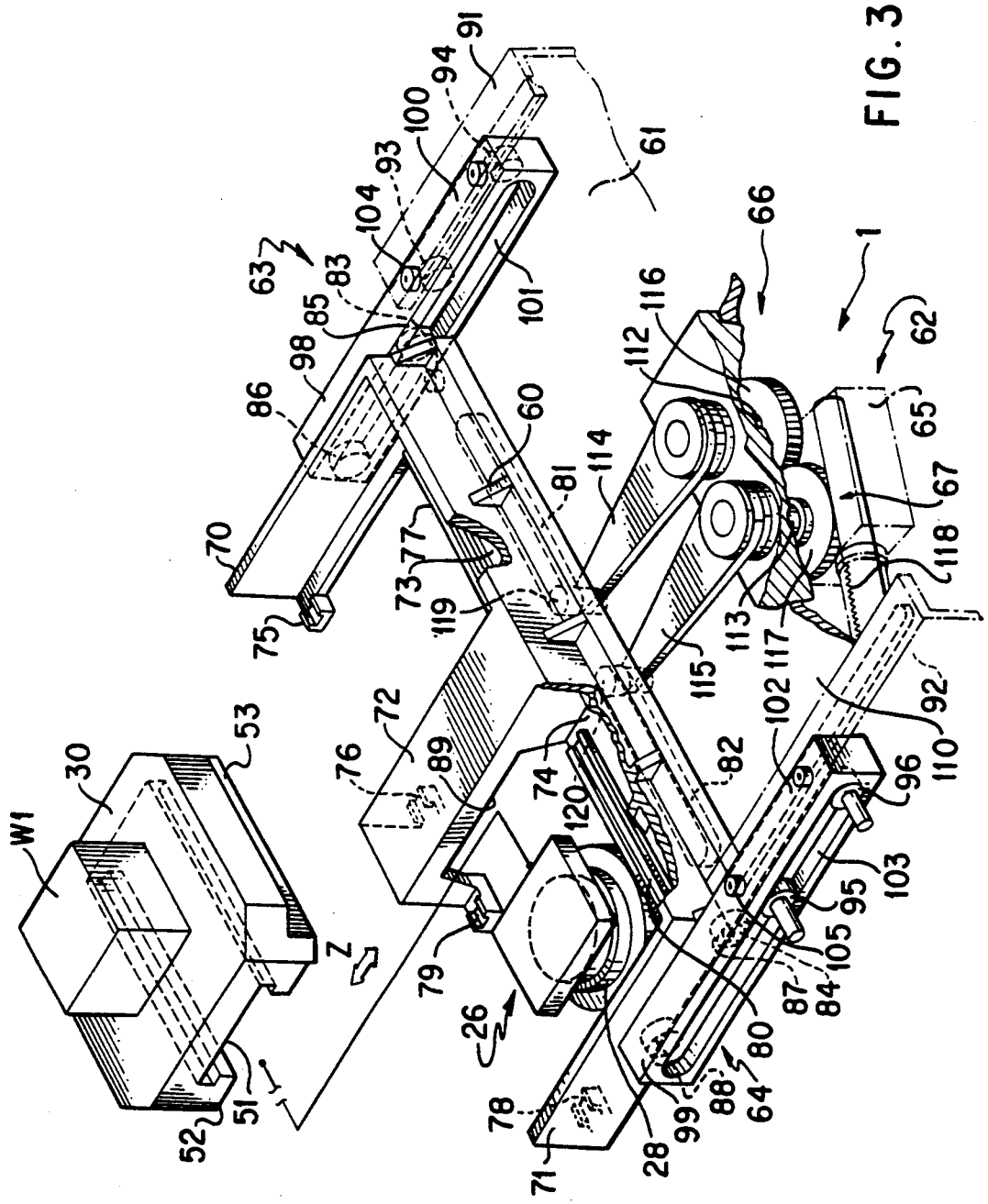
FIG. 3 is a perspective view showing the pallet changer.

The pallet 30 shown in FIG. 3 has a groove 51 at it's lower portion. Projections 52, 53 are provided along the groove 51.

The pallet changer shown in FIG. 3 comprises a place board 60, a support stand 61, a transfer means 62 and the table 26.

PLACE BOARD

The place board 60 has a first portion 70, a second portion 71, a middle portion 72, and connecting portions 73, 74. A receiving member 75 is provided to the first portion 70. The receiving members 76, 79 are provided to the middle portion 72. A receiving member 78 is provided to the second portion 71. A receiving member 77 is provided to the connecting portion 73. A receiving member 80 is provided to the connecting portion 74. The receiving members 75, 76, 77 receive the projections 52, 53 of the pallet. The receiving members 78, 79, 80 receive the projections 52, 53. The place board has grooves 81, 82. The grooves 81, 82 are perpendicular to a direction (along Y-axis) in which the receiving members move.

The first portion 70 has followers 83, 85, 86. The second portion 71 has followers 84, 87, 88. The middle portion has a C-shape section and has a passage 89.

Figure 5:
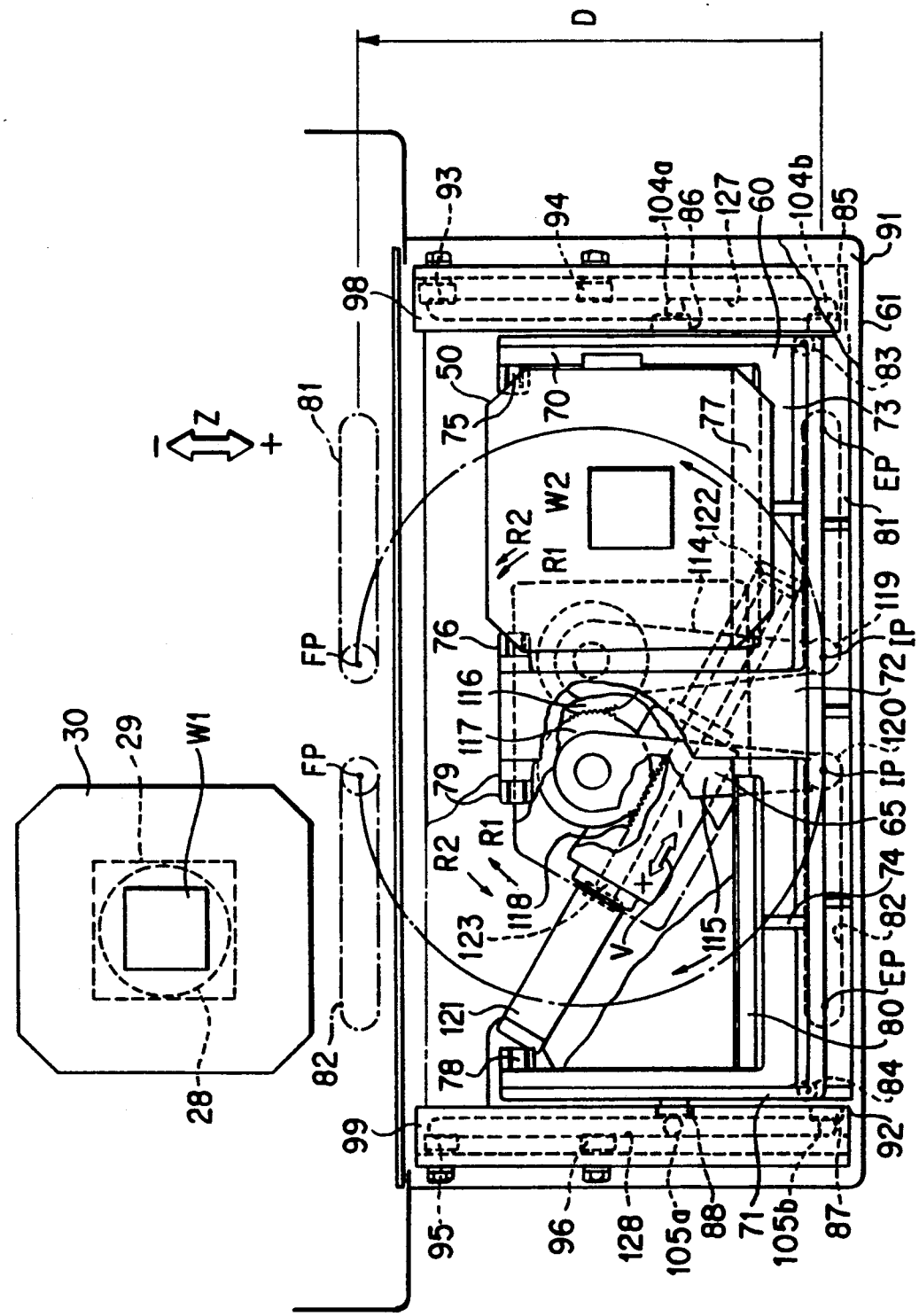
FIG. 5 is a top view of the pallet changer.

SUPPORT STAND (refer to FIGS. 3 and 5)

Figure 6:
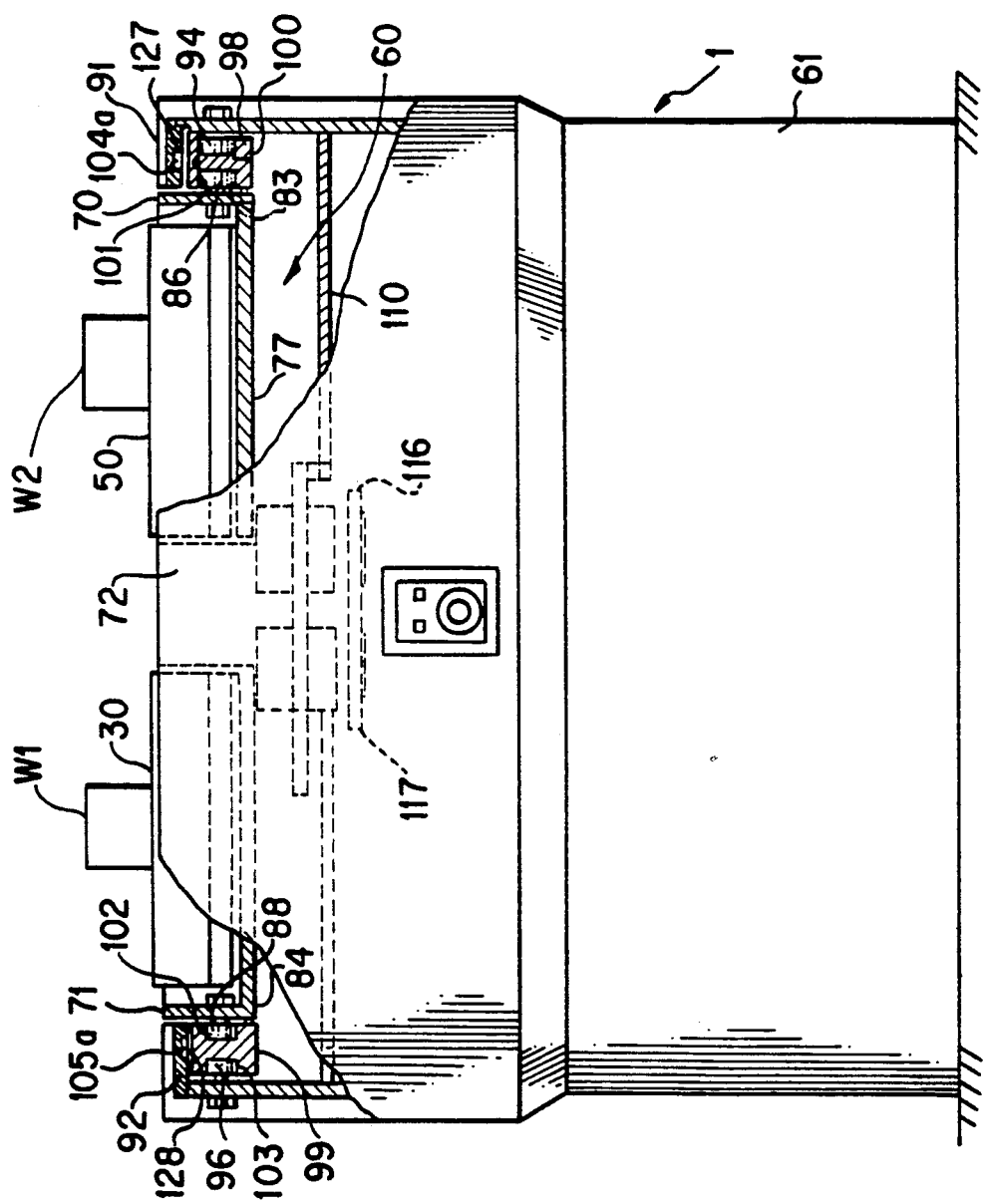
FIG. 6 is a front view of the pallet changer.

The support stand 61 supports the place board 60. The support stand 61 has upper boards 91, 92. Followers 93, 94 are provided under the upper board 91. Followers 95, 96 are provided under the upper board 92. Support and guide means 63, 64 of the support stand 61 are symmetrical. A linear guide 98 of the support and guide means 63 has an I-shape section or a H-shape section. The linear guide 98 has grooves 100, 101 along it's longitudinal direction. A linear guide 99 of the support and guide means 64 has also guide grooves 102, 103. (The guide grooves 100, 102 are shown in FIG. 6.) The followers 93, 94 engage the guide groove 100 of the linear guide 98. The followers 85, 86 engage the guide groove 101. The followers 87, 88 engage the guide groove 102 of the linear guide 99. And the followers 95, 96 engage the guide groove 103. Followers 104a, 104b are attached to the upper portion of the linear guide 98. Followers 105a, 105b are attached to the linear guide 99.

TRANSFER MEANS

Figure 4:
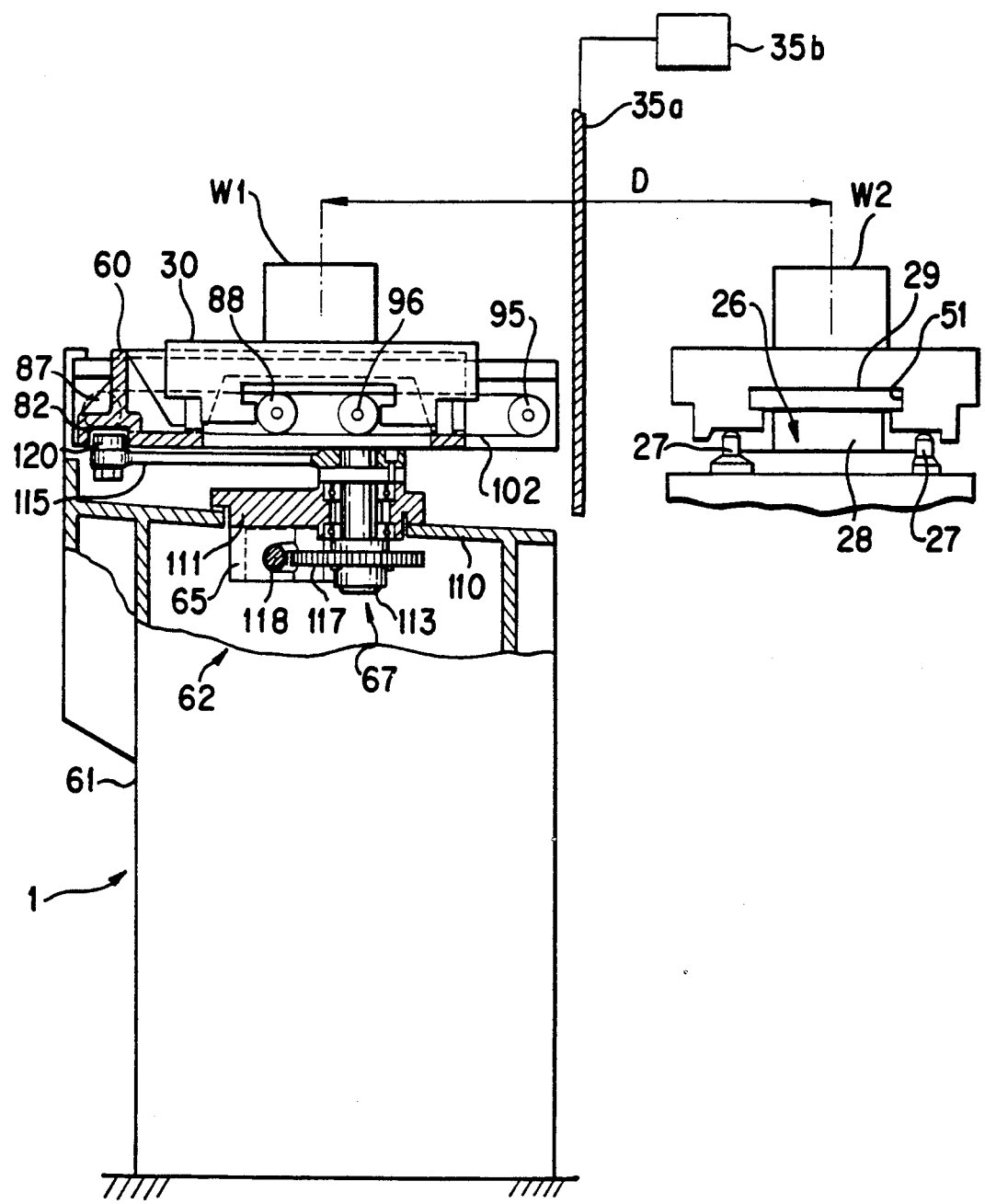
FIG. 4 is a side view, partly in cross section, of the pallet changer.

The transfer means 62 is illustrated in FIGS. 3 and 4. The transfer means 62 has a drive means 65 and operating means 66, 67. The operate means 66 has a link shaft 112 and a link arm 114 and a pinion 116. The operate means 67 has a link shaft 113 and a link arm 115 and a pinion 117.

A member 111 (FIG. 4) is provided to a support board 110 of the support stand 61. The link shafts 112, 113 are rotatably attached to the member 111. The second end of the link arm 114 attached to the link shaft 112. The second end of the link arm 115 is attached to the link shaft 113. A rotate body 119 is attached to the first end of the link arm 114. A rotate body 120 is attached to the first end of the link arm 115. The rotate body 119 engages the groove 81 of the place board 60. And the rotate body 120 engages the groove 82.

The pinion 116 is attached to the link shaft 112. The pinion 117 is attached to the link shaft 113. The pinion 116 engages the pinion 117. The pinion 117 engages a rack 118. The rack 118 is fixed to the drive means 65.

A shutter 35a shown in FIG. 4 can move in a vertical direction by means of a drive source 35b. When the place board 60 moves, the shutter 35a is opened. The drive source 35b is operated by means of the instruction of the CNC device.

DRIVE MEANS (FIG. 5)

The drive means 65 has oil chambers 121, 122 at both ends. An oil is inserted into either of the oil chambers 121, 122 so that a shaft 123 is moved in a direction of arrow V. When the drive means 65 is moved, for instance, in the direction of arrow V(+), the pinion 117 is rotated in a direction of arrow R1 and the pinion 116 in a direction of arrow R2. Accordingly, the link arm 115 is rotated clockwise from the initial position IP to the final position FP by 180 degrees, while the link arm 114 rotates counter-clockwise from the initial position IP to the final position FP by 180 degrees.

When link arm 115 rotates by 90 degrees, the rotating body 120 (also 119 in FIG. 3) moves from one end IP of the place board to the other end EP. When link arm 115 further rotates another 90 degrees, the rotating body 120 returns to one end IP from the other end EP of the place board.

When the link arm 114 rotates by 90 degrees in a direction of arrow R2, the rotate body 119 moves from one end IP of the groove 81 to the other end EP. When the link arm 114 rotates counter-clockwise by 90 degrees, the rotate body 119 returns to the one end IP from the other end EP.

Thus, the links 114, 115 rotate by 180 degrees so that the place board 60 moves in a direction of arrow Z(−) by a stroke D. As a result, the place board 60 is placed on the table 26.

The drive means 65 is driven in a direction of arrow V(−) so that the place board 60 is returned from the table 26 to the support stand 61.

Thus, the place board 60 is moved by means of links and rotation boards and guide grooves, so the place board is smoothly moved without that the pallet and the work on the pallet are not shocked.

As illustrated in FIG. 6, the followers 104a 104b of the linear guide 98 are guided by means of a groove 127 of the upper board while the followers 105a, 105b are guided by means of the groove 128.

When the place board 60 is transferred toward the table 26, the place board 60 is transferred in a direction of arrow Z(−) as shown in FIG. 5. When the cam followers 86, 88 come to the first ends of the linear guides 98, 99, the linear guides 98, 99 start to move in the direction of arrow Z(−) with the place board 60. When the followers 94, 96 come to the second end of the linear guides 98, 99, the linear guides 98, 99 stop moving in the direction of arrow Z(−).

When the place board 60 is returned to the support stand 61, the place board, is tranferred in a direction of arrow Z(+) until the followers 85, 87 come to the end of the linear guides 98, 99. The linear guides 98, 99 are then transferred in the direction of arrow Z(+) with the place board 60 and returned to the support stand 61.

Figure 7:
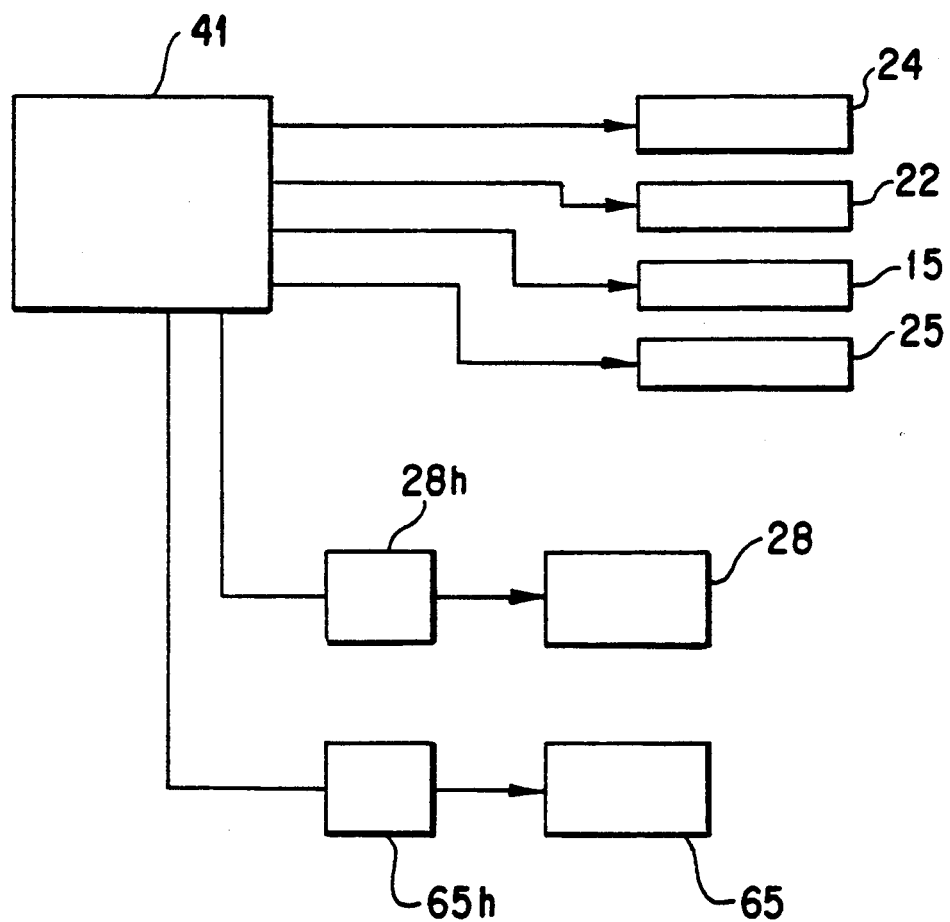
FIG. 7 is a view showing the relationship between the servomotors, the cylinders and a CNC device.

As shown in FIG. 7, the servomotors 15, 22, 24, 25 are operated by means of the instruction of the CNC device 41. The clamp cylinder 26 and the drive means 65 (which may be called a rack cylinder) are connected to drive sources 28h and 65h, respectively. The drive sources 28h, 65h are operated by means of the instruction of the CNC device 41.

Figure 8:
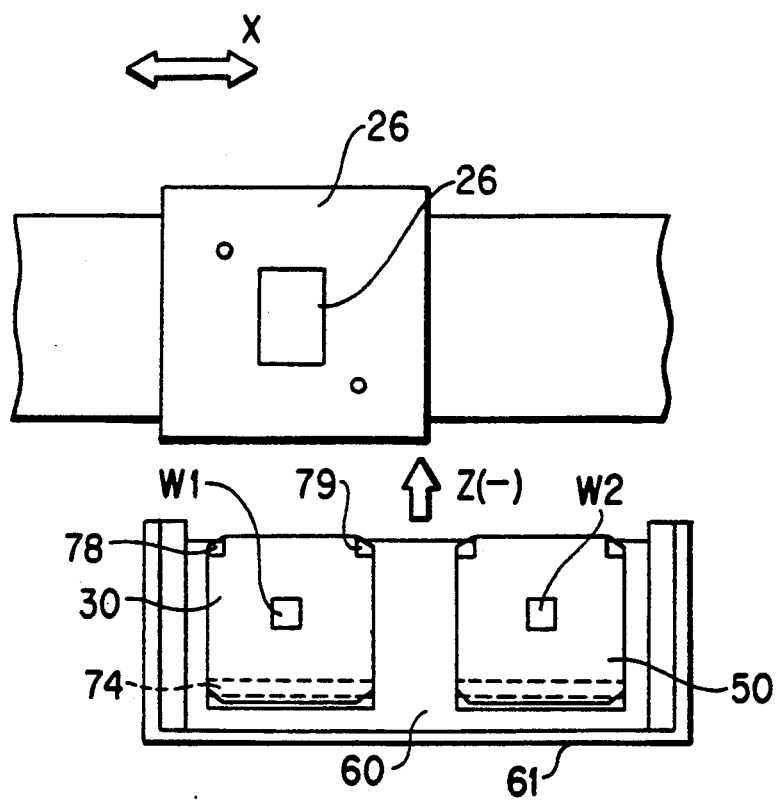
FIG. 8 to 33 are explanatory views showing the operation of the pallet changer.
Figure 9:
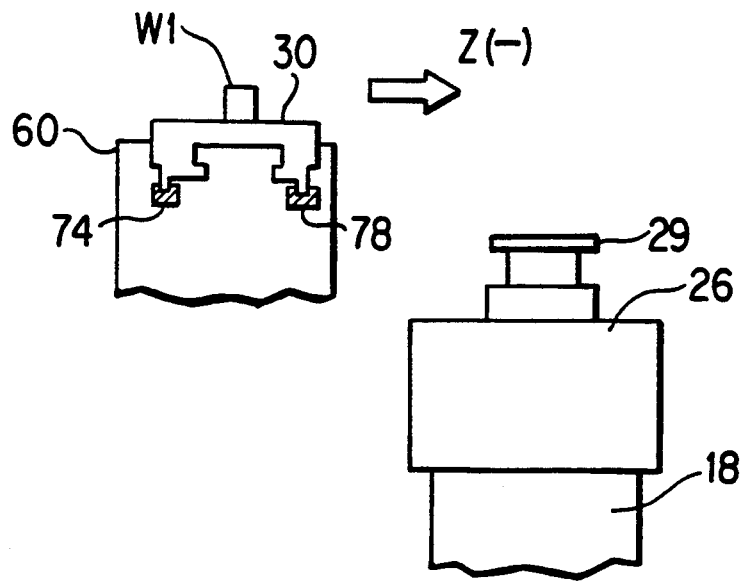

The operation of the pallet changer can be understood by referring to FIGS. 8 and 9. The pallets 30, 50 are located on the place board 60. The table 26 or the knee 18 (in FIG. 9) is in a low position. The clamp plate 29 is located in a lower position than that of the both pallets 30 and 50. The place board 60 is seated at the support board 61.

The table 26 is located in the position opposite to the pallet 30. The place board 60 is transferred in the direction of arrow Z(−).

Figure 10:
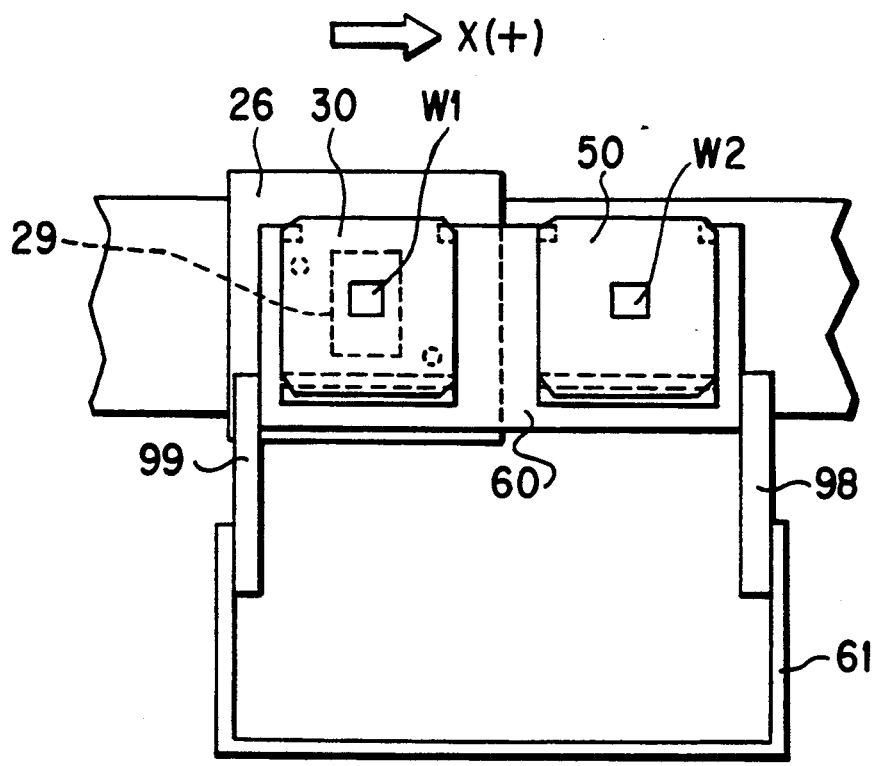
Figure 11:
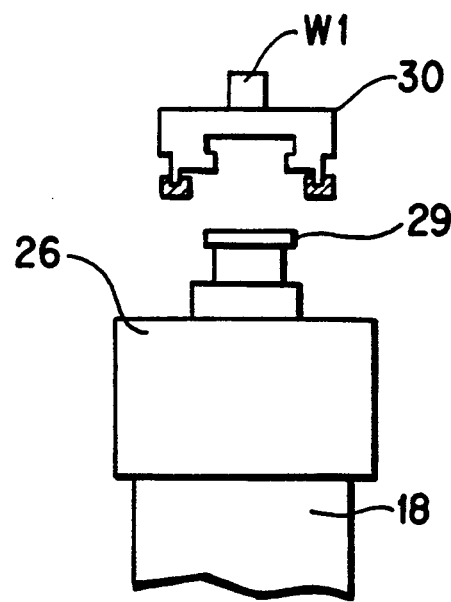

Accordingly, pallet 30 is transferred to the position above the clamp plate 29 of the table shown in FIGS. 10, 11.

Figure 12:
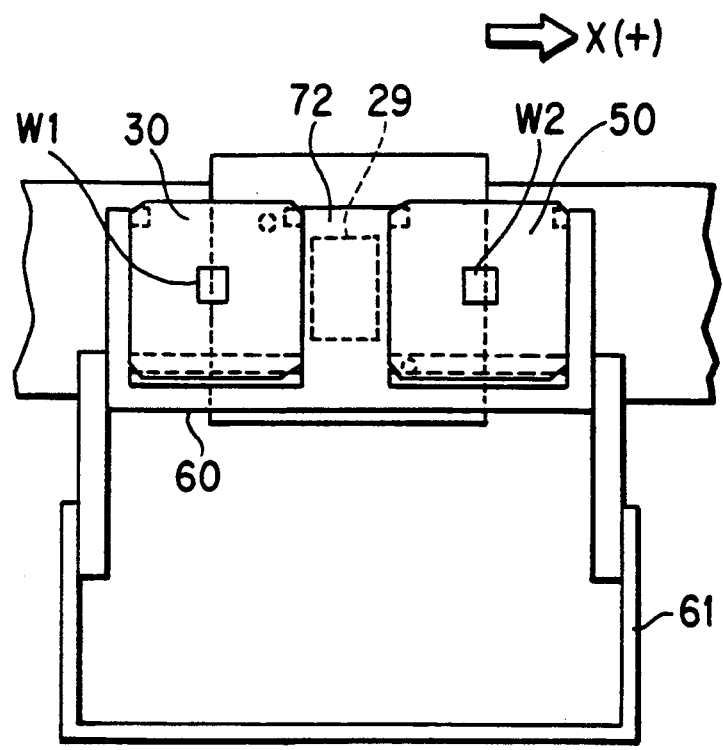

FIG. 12 illustrates that the table 26 moves in the direction of arrow X(+) until it comes under the middle portion 72.

Figure 13:
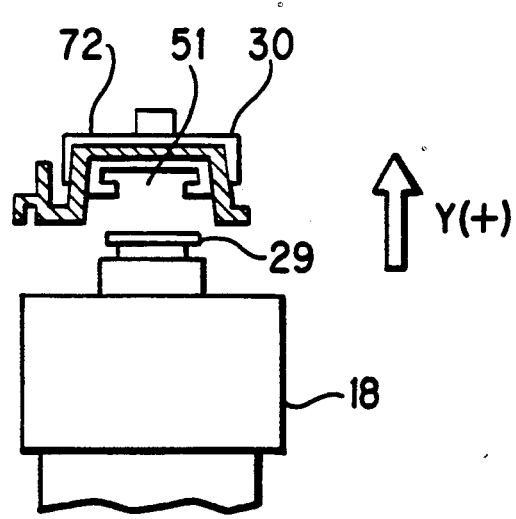
Figure 14:
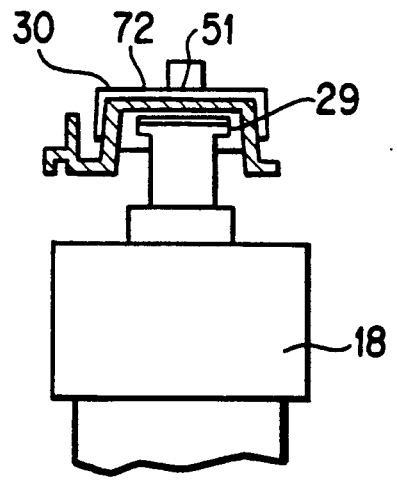

FIG. 13 illustrates that the knee 18 is transferred in a direction of arrow Y(+) so that the pallet 30 is transferred to the same level of the groove 51 of the clamp plate 29 shown in FIG. 14.

Figure 15:
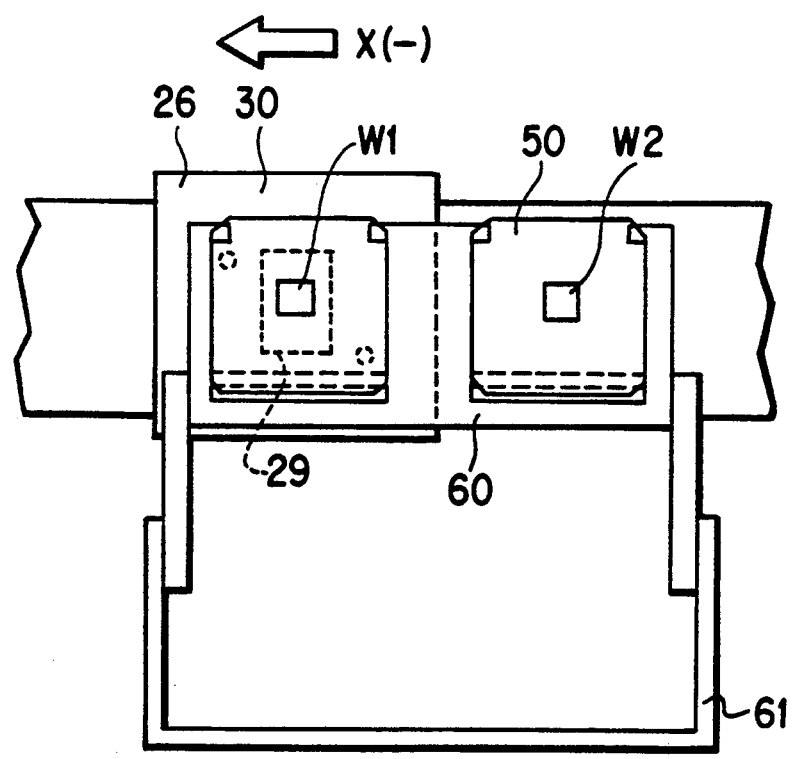
Figure 16:
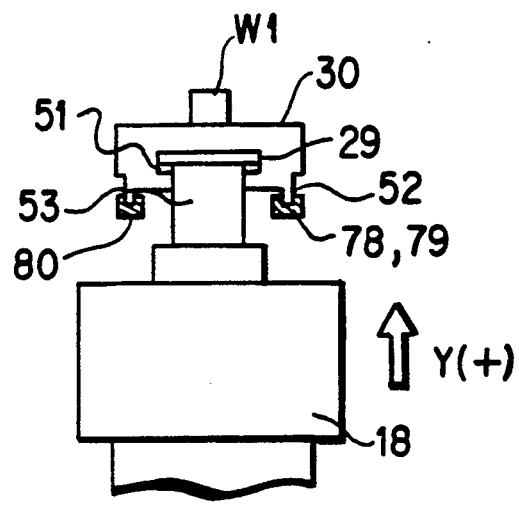
Figure 17:
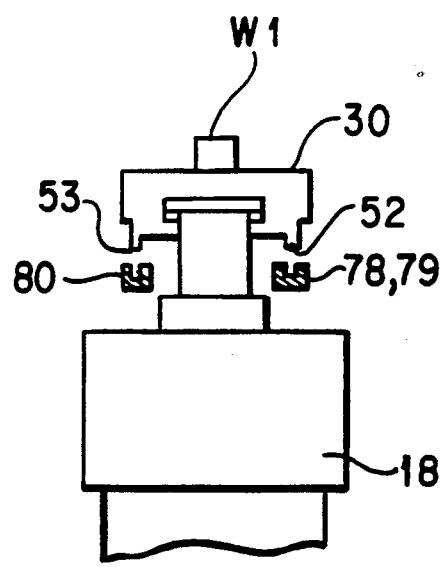

As seen from FIGS. 15 and 16, the table 26 moves in the direction of arrow X(−) so that the clamp plate 29 engages the groove of the pallet 30. Once engaged, the knee 18 is transferred in the direction of arrow Y(+).

Thus, the projections 52, 53 of the pallet 30 is detached from the receiving members 78, 79, 80.

Figure 18:
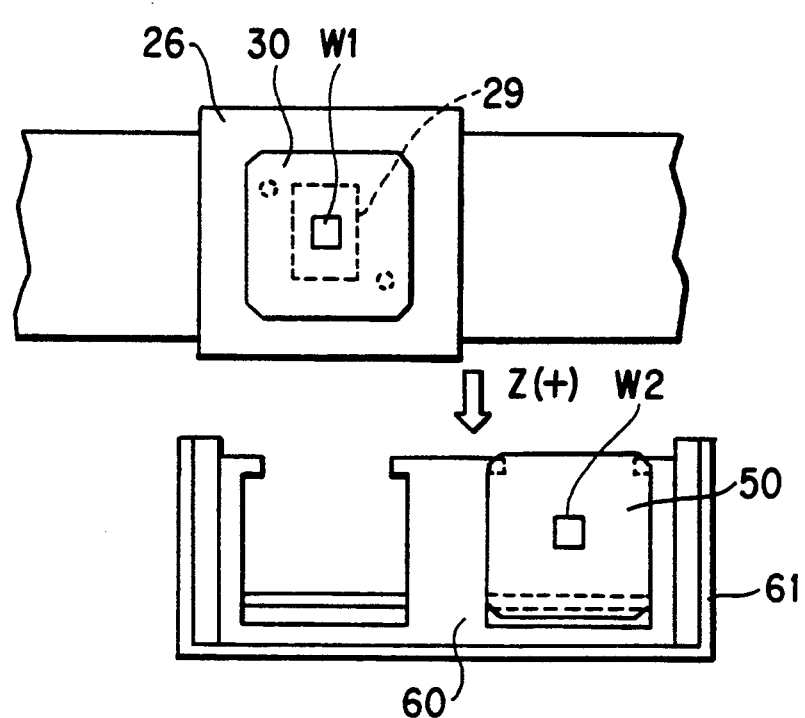

As seen in FIG. 18, the place board 60 is then transferred in the direction of arrow Z(+) and is returned to the support stand 61.

The rod of the clamp cylinder 28 is contracted so that the pallet 30 is transferred downward. (See FIG. 1) The pallet 30 is clamped against the clamp pins 27, 27. The work W1 is machined by the tool 17 in a predetermined manner. After the work W1 is machined, the rod of the clamp cylinder 28 is expanded so that the pallet 30 is unclamped.

Figure 19:
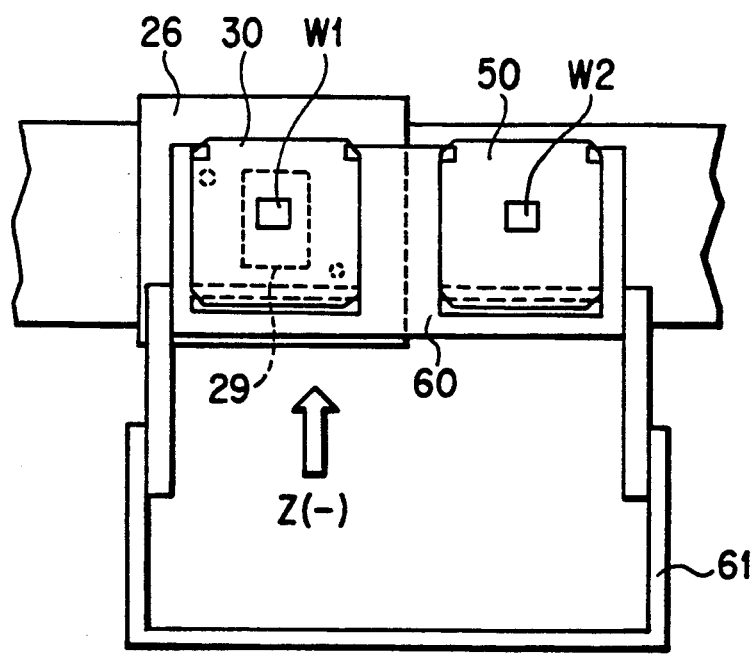
Figure 20:
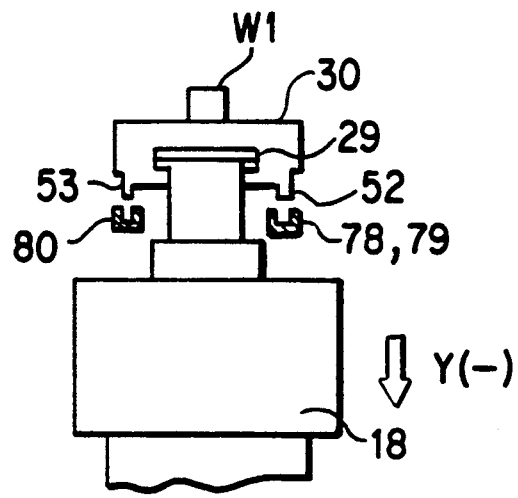

FIGS. 19 and 20 show the place board 60 moves in the direction of arrow Z(−) so as to locate under the table 26. Once under table 26, the knee 18 is transferred downward in the direction of arrow Y(−).

Figure 21:
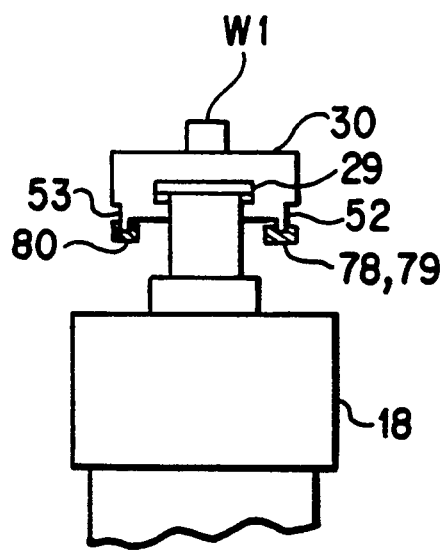

FIG. 21 illustrates that the projections 52, 53 of the pallet 30 are placed on the receiving members 78, 79, 80.

Figure 22:
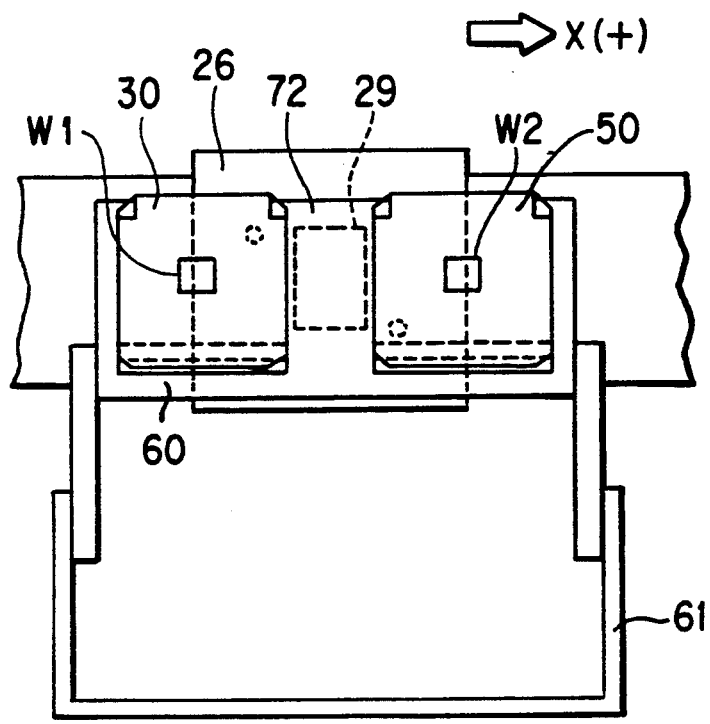
Figure 23:
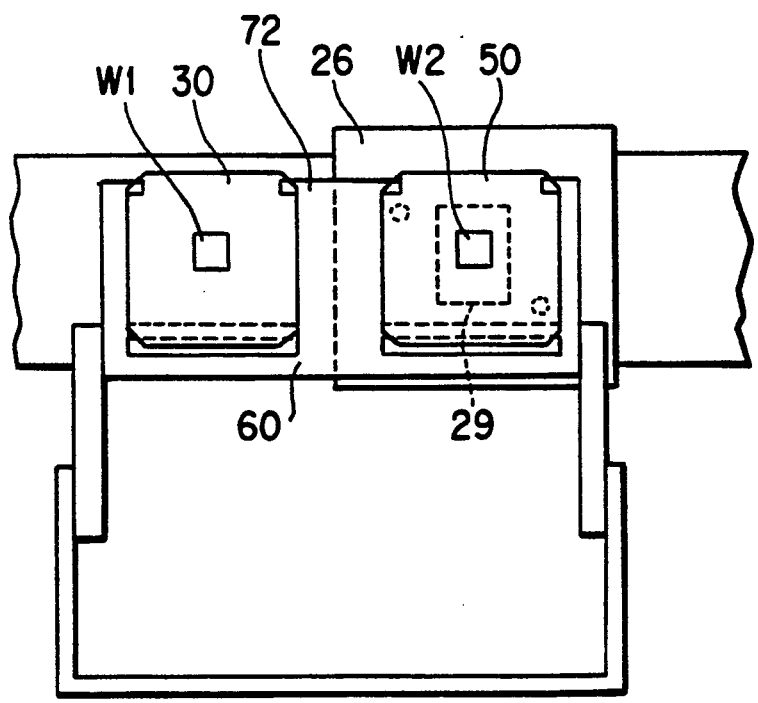
Figure 24:
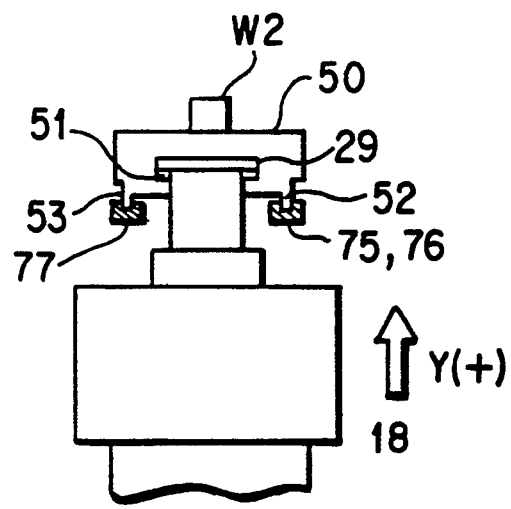

The table 26 is transferred in the direction of X(+) as shown in FIGS. 22 and 23. Accordingly, the clamp plate 29 is detached from the pallet 30 and transferred under the middle portion 72 and placed into the groove of the pallet 50 as shown in FIGS. 23 and 24. Next, the knee 18 is transferred upward in the direction of arrow Y(+).

Figure 25:
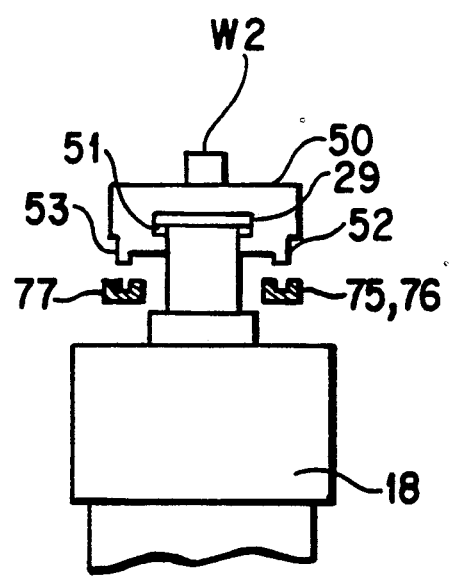

The projections 52, 53 of the pallet 50 are detached from the receiving members 75, 76, 77 as shown in FIG. 25.

Figure 26:
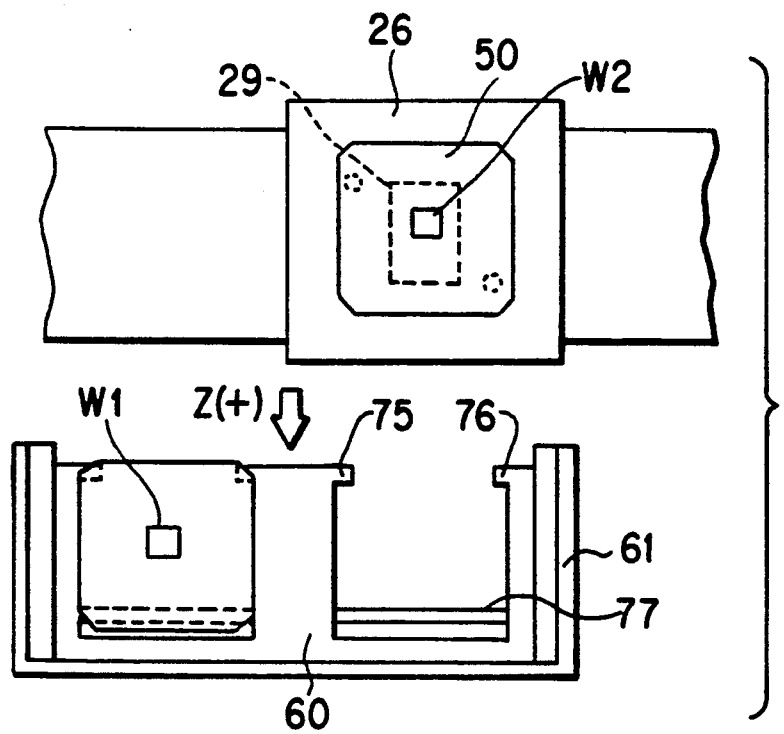

FIG. 26 illustrates that the place board 60 is transferred in the direction of arrow Z(+) and is returned to the support stand 61.

Referring to FIG. 1 again, the rod of the clamp cylinder 28 is contracted so that the pallet 50 is clamped against the clamp pins 27, 27. And the work W2 is machined by the tool 17 in a predetermined manner. After the work W2 is machined, the rod of the clamp cylinder 28 is expanded so that the pallet 50 is unclamped.

Figure 27:
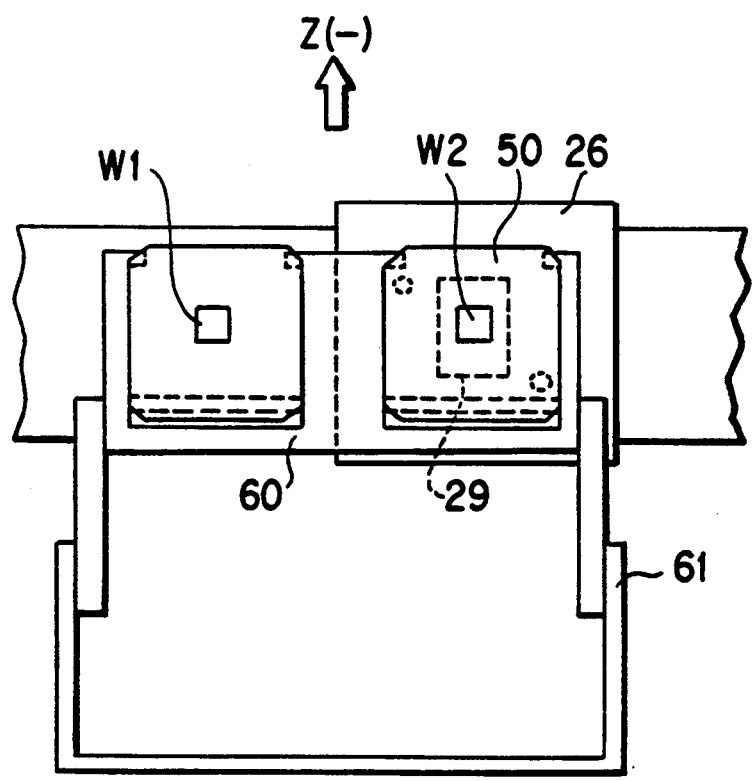
Figure 28:
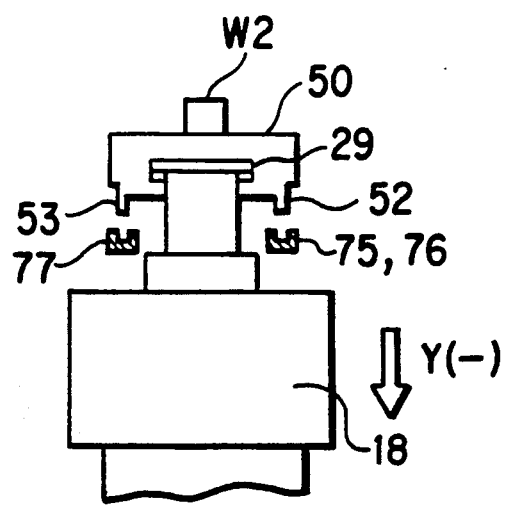

FIGS. 27 and 28 illustrate that the place board 60 is again transferred in the direction of Z(−) so as to be located under the table 26 and that the knee 18 is transferred downward in the direction of arrow Y(−).

Figure 29:
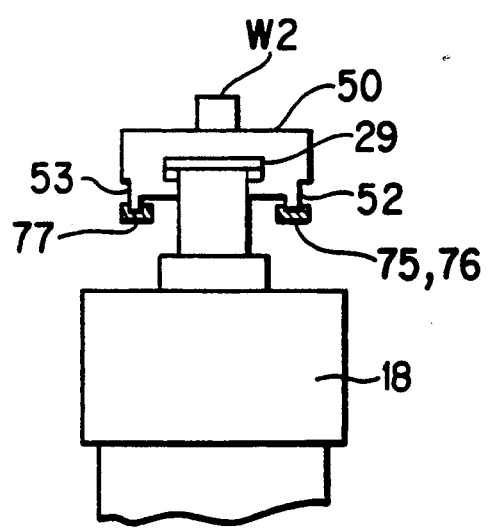

FIG. 29 illustrates that the projections 52, 53 are placed on the receiving member 76, 77.

Figure 30:
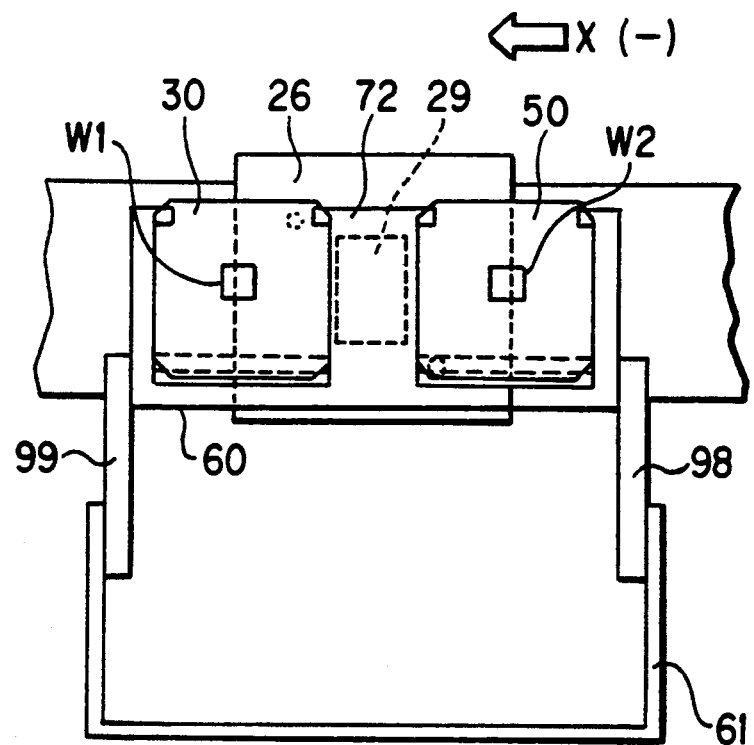
Figure 31:
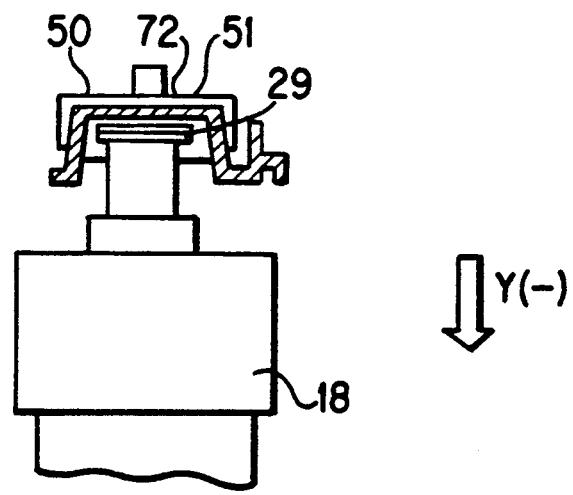

Referring to FIGS. 30 and 31, the table 26 is transferred in the direction of arrow X(−) so as to be located under the middle portion 72 of the place board 60. The clamp plate 29 is detached from the groove of the pallet 50. (identical to pallet 30 shown in FIG. 3)

Figure 32:
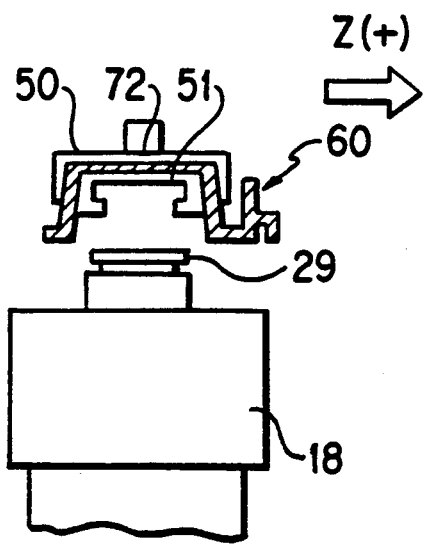
Figure 33:
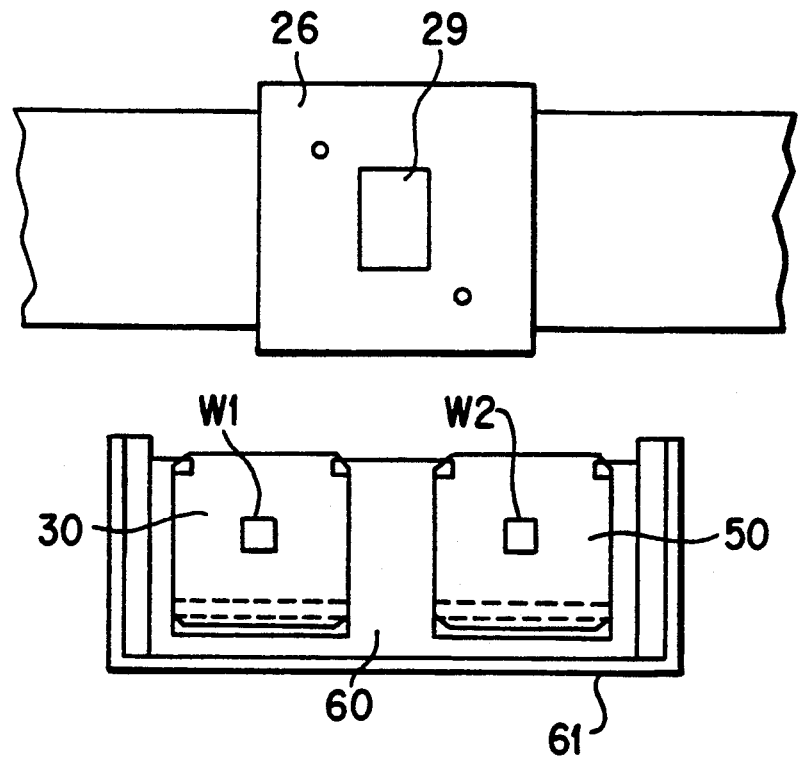

Referring to FIG. 31, the knee is transferred downward in the direction of arrow Y(−). The place board 60 is transferred in the direction of arrow Z(+) as shown in FIG. 32, and the place board 60 is returned to the support stand 61 as shown in FIG. 33. Thus, the pallets 30, 50 are exchanged.

This invention is not restricted to the before-mentioned embodiment. The pallet changer can be applied to a general machine for changing pallets of a X-Y table as well as a machine tool. The number of pallets located on the place board may be three or more.

INDUSTRIAL APPLICABILITY

A pallet changer according to this invention is very useful as a pallet changer, and a heavy hydraulic cylinder does not need.

I claim:

1. A pallet changer for a machine tool, comprising:
   a machine tool table;
   first drive means for moving said machine tool table along a fist axis;
   second drive means for moving said machine tool table along a second axis;
   mounting means for mounting a plurality of pallets, each said pallet having a work piece, said mounting means comprising:
   guide means arranged along said first axis,
   a first mounting part and a second mounting part, and
   an intermediate part disposed between said first mounting part and said second mounting part and including means for permitting the machine tool table to pass there through, one of said pallets being supported between said first and intermediate mounting parts and another of said pallets being supported between said second and intermediate parts;
   support means or supporting the mounting means; and
   moving means for moving the mounting means relative to the machine tool table along a third axis perpendicular to said first axis and said second axis, said moving means comprising:
   third drive means mounted on said support means so as to be linearly moveable, and
   operating means driven by said third drive means in cooperation with said guide means for moving said mounting means on said support means relative to said machine tool table;
   wherein said machine tool table is movable along said first axis so as to detachably engage a pallet with said mounting means, and said machine tool table is movable along said second axis so as to remove a pallet from engagement with said mounting means.

2. A pallet changer as claimed in claim 1, wherein said operating means comprises a rotary member which is guided in said guide means.

3. A pallet changer as claimed in claim 1, wherein said cooperating means is rotatable over a range of 180°.

4. A pallet changer as claimed in claim 1, wherein said mounting means is supported on said support means by a pair of linear guides.

5. A pallet changer as claimed in claim 1, wherein said machine tool table is a rotary table.

6. A pallet changer as claimed in claim 4, wherein said machine tool table is a rotary table.

7. A pallet changer as claimed in claim 1, wherein said third drive means has a rack, and wherein the rack is moveable along a fourth axis.

8. The pallet as claimed in claim 7, wherein said rack engages a first pinion of the operating means, and wherein said first pinion engages a second pinion of the operating means.

* * * * *